March 24, 1931. E. G. STONE ET AL 1,797,558
LOADING APPARATUS
Filed Aug. 22, 1927  2 Sheets-Sheet 1
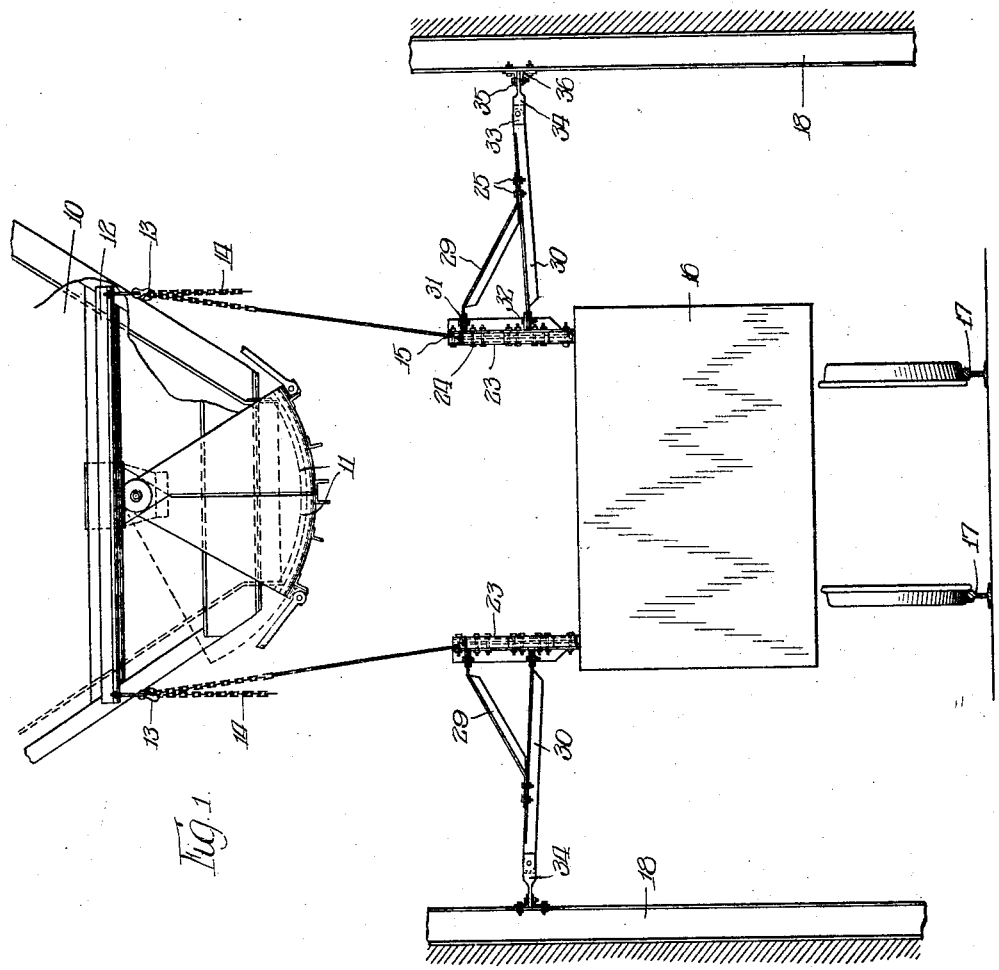
Inventors:
Elmer G. Stone,
Harold M. Rutherford,

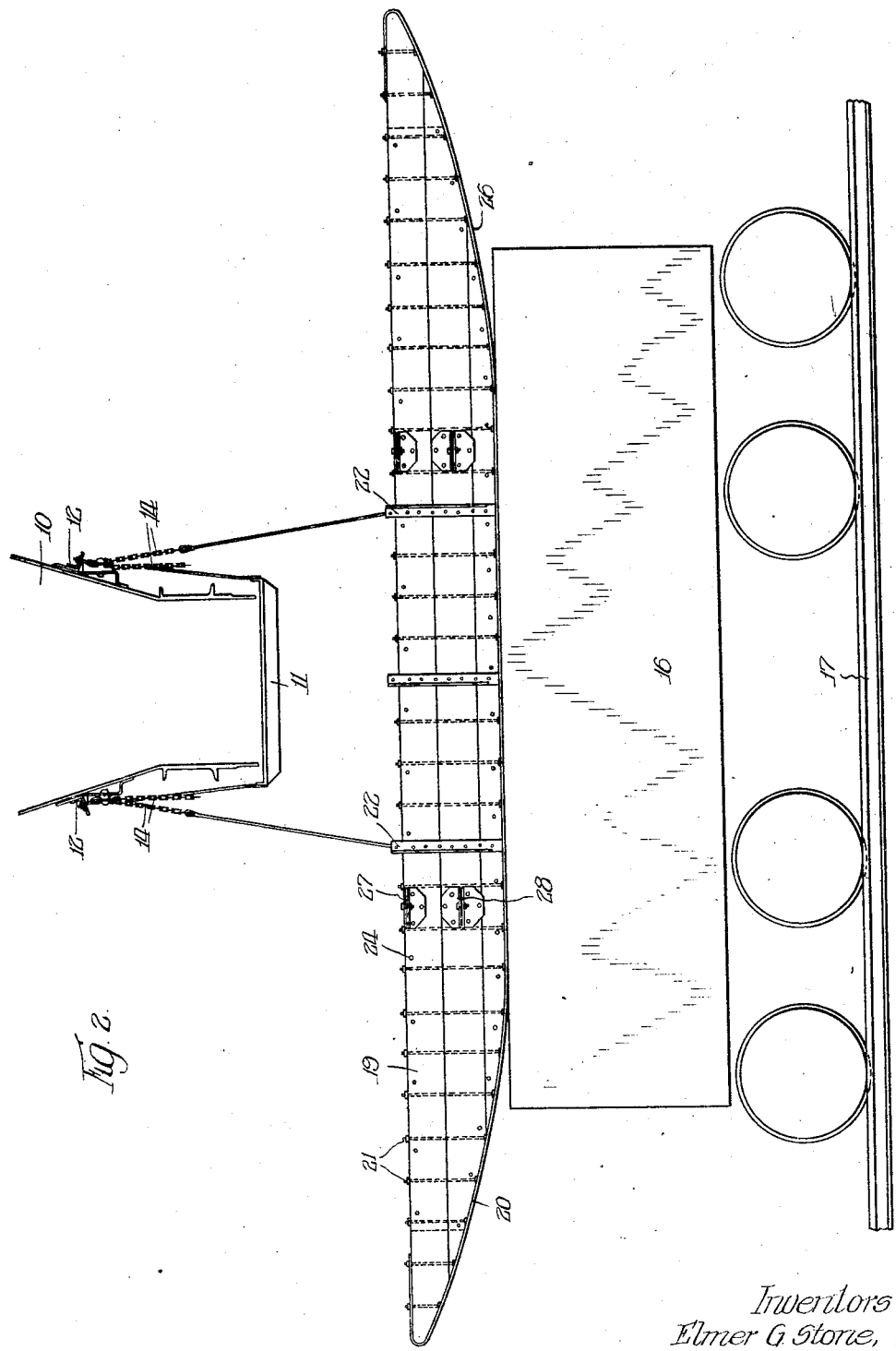

Patented Mar. 24, 1931

1,797,558

UNITED STATES PATENT OFFICE

ELMER G. STONE AND HAROLD M. RUTHERFORD, OF HIBBING, MINNESOTA

LOADING APPARATUS

Application filed August 22, 1927. Serial No. 214,572.

The invention pertains to a method and apparatus for loading vehicles, and accurately disposing lading in a vehicle during and after the loading operation.

It is an object of this invention to provide an inexpensive and effective means cooperating with a hopper or lading pocket and a vehicle to so position the lading that it will not be spilled out of the vehicle.

Another object is to provide a substantial, commercially feasible and durable apparatus to be used in loading vehicles, particularly cars adapted to be loaded from an overhead source.

A further object is to provide a composite, substantially universally adjustable means so arranged with respect to a lading pocket and a vehicle that the lading with which the vehicle is charged may be so arranged by the movement of the vehicle that it will not spill.

Other, various and more specific objects will readily appear from the detailed description, claims and drawings appended hereto.

In the drawings, wherein like reference characters are used to designate like parts—

Figure 1 is a vertical section through an ore pocket, showing the relation between the pocket, vehicle and spill boards for guiding the lading into the vehicle; and Figure 2 is a vertical longitudinal view of Figure 1.

An ore pocket 10 having the usual doors or gates 11 for controlling the flow of lading from said pocket is provided with reinforcing means 12 in the form of angles shown running transversely thereof and adapted to receive hook members 13. The hook members 13 are used to support adjustable suspension cables 14 connected to and supporting spill boards 15. The spill boards 15 are adapted to be positioned on either side of a vehicle 16, shown as a railway car, which car may run on tracks 17 suitably positioned between the pocket supporting columns 18. These spill boards may be composite structures comprising longitudinally extending timbers 19, suitably shaped toward the ends 20, which timbers are fastened together by means such as properly spaced bolts 21 which may also be used to fasten a metal shoe 26 to the edge of said spill board, said shoe preferably extending a short distance along the top of the spill board adjacent the ends thereof and completely along the bottom edge of said board to thereby protect the parts of the timbers liable to contact with the vehicle from wear.

Other suitable reinforcing means 22, preferably vertically disposed and which may take the form of angles, are suitably spaced along the length of the spill board and may be used as a fastening means between the suspension cables and the ore pocket. The spill board is preferably reinforced by a metal plate 23 extending along the face of the board used for guiding ore into the car, said metal plate being fastened to the timbers by any means such as the bolts 24. Other suitable brackets 27 and 28, which may be in the form of clips, are provided on opposite sides of the timbers from the plate 23 for the purpose of receiving further supporting or thrust means for the spill board. These brackets 27 and 28 have pivoted thereto at 31 and 32 the supporting members 29 and 30, said members being preferably fastened together at 25. The support so formed is pivoted at 33 for vertical movement to a member 34 in turn pivoted at 35 for horizontal movement to a suitable bracket 36 secured to and carried by the supporting columns 18. It will thus be seen that the spill boards have practically a universal movement.

In order to load the vehicle 16 to its maximum capacity, it is necessary that the load be heaped up above the top edge of the vehicle top, and heretofore this heaping is usually accompanied by considerable spilling of the material from the vehicle, which spilling is very expensive to reclaim. To prevent this spilling, spill boards 15 such as shown are suspended so that the vehicle may be positioned beneath them. The vehicle is then run under the ore pocket 10, said vehicle being positioned so that the ore pocket is either a trifle ahead of the center of the vehicle or over the center of the vehicle, and the spill boards are properly adjusted vertically and horizontally by the suspension cables 14 and the supports 29 and 30. The vehicle then may be rapidly filled, the tendency being to heap the ore up in the vehicle immediately under the pocket gates 11, leaving the ends somewhat unfilled. The gates 11 are then closed and the car is moved in order to position the next vehicle of the train under the pocket. This movement it will be readily appreciated serves to guide a portion of the heaped material into the unfilled parts of the vehicle, the spill boards preventing the ore from spilling over the edges of said vehicle.

It will be appreciated that the construction described is a very rugged one due to the disposition of parts and reinforcements provided, but we do not wish to be limited by the embodiment shown as other and various forms of the device will readily appear to those skilled in the art.

We claim:

1. A composite spill board comprising a reinforced load engaging surface and an edge engaging and reinforcing shoe, fastening means on another surface of said board, adjustable fastening and positioning means fastened to said fastening means, and adjustable means fastened to an edge of said board to support said board at a predetermined position.

2. An apparatus for use in loading comprising, in combination, a discharge chute, a plurality of spaced and elongated parallel guides extending beneath the chute, supporting walls located adjacent the guides and between which the structure being loaded is stationed, a plurality of flexible elements secured to the chute and suspending the guides therefrom, horizontal members horizontally pivoted to said guides and extending outward therefrom, said members each being adapted to be vertically pivoted to its adjacent supporting wall, whereby said guides are supported for free vertical and horizontal adjustment.

3. An apparatus for use in loading comprising, in combination, a discharge chute, and a plurality of guides positioned beneath the chute and spaced apart by a distance corresponding approximately to the width of a structure being loaded, horizontal members secured to said guides and to a supporting wall for bracing said guides against displacement bodily towards or away from the wall, said members being pivotally secured to said supporting wall for mounting said guides for free vertical adjustment.

4. An apparatus for use in loading comprising, in combination, a plurality of elongated guides spaced apart by a distance corresponding approximately to the width of a structure being loaded, said guides being of a length in excess of the structure being loaded, bracing means secured to the guides and extending therefrom, said bracing means preventing displacement bodily of the guides towards or away from a supporting wall, and means associating said bracing means with said wall for effecting vertical adjustment thereof.

Signed at Hibbing, Minnesota, this 3rd day of August, 1927.

ELMER G. STONE.
HAROLD M. RUTHERFORD.